April 25, 1933. L. W. THOMPSON ET AL 1,905,766

POWER RESPONSIVE MEANS

Original Filed Jan. 13, 1930

Inventor:
Louis W. Thompson,
Myron Zucker,
by *Charles V. Mullen*
Their Attorney Patented Apr. 25, 1933

1,905,766

UNITED STATES PATENT OFFICE

LOUIS W. THOMPSON, OF SCHENECTADY, NEW YORK, AND MYRON ZUCKER, OF ROYAL OAK, MICHIGAN, ASSIGNORS TO GENERAL ELECTRIC COMPANY, A CORPORATION OF NEW YORK

POWER RESPONSIVE MEANS

Original application filed January 13, 1930, Serial No. 420,309. Divided and this application filed February 2, 1931. Serial No. 512,874.

Our invention relates to power responsive means, and more particularly to power responsive means which are adapted for use in load regulating systems.

Regulating systems, such as load regulating systems for maintaining a constant load on electric motor operated machinery, for example, wood pulp grinders, depend for their operation upon a device responsive to the power flow through the circuit supplying the motor. Such devices are usually of delicate, complicated and expensive construction, especially when the power circuit is a polyphase circuit. Due to their delicacy and lightness of construction these devices cannot control directly the necessary regulating currents and consequently they are almost invariably associated with a suitable relay, the inclusion of which in the system necessarily adds to its complexity, cost and tendency to unreliability. We have devised a novel power responsive induction torque motor which is capable of general application as a power responsive means and which is capable of use directly as the power responsive element of a load regulating system.

In our earlier filed application, (Serial No. 420,309, filed Jan. 13, 1930, patented Feb. 23, 1932, No. 1,846,923, and assigned to the assignee of the present application) of which the present application is a division, we have disclosed and claimed a novel load regulating system which has as its power responsive device the means which is the subject matter of the present invention.

It is an object of the present invention to provide a new and improved polyphase power responsive means.

Our invention will be better understood from the following description taken in connection with the accompanying drawing, and its scope will be pointed out in the appended claims.

Figure 1:
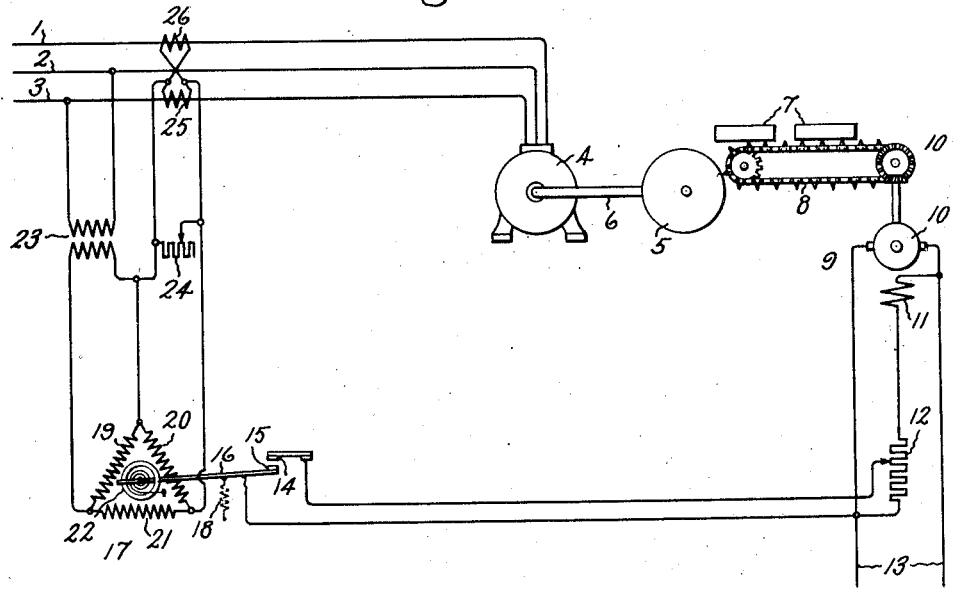
Figure 2:
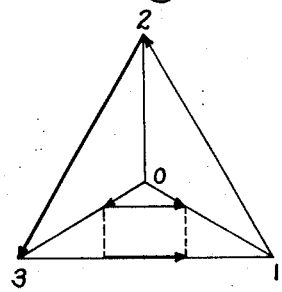
Figure 3:
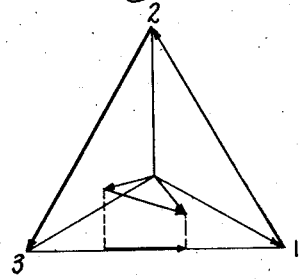

In the drawing, Fig. 1 is a schematic view of a load regulating system which includes our novel power responsive means while Figs. 2 and 3 are vector diagrams of the current relations in our induction torque motor power responsive means at unity power factor and at slightly lagging power factor respectively.

Referring now to Fig. 1 wherein an embodiment of our invention is illustrated as the power responsive means of a load regulating system, 1, 2 and 3 represent the conductors of a three-phase power circuit which, as shown, are connected to a motor 4. This motor may be of any suitable type such as an induction motor or a synchronous motor. Driven by motor 4 is a grinder 5, which is mechanically coupled to motor 4 by any suitable means, shown as the shaft 6. The work 7 is fed to grinder 5 by means of an endless conveyor belt 8, which is driven through suitable gearing by a motor 9 having an armature 10 and a shunt field winding 11, in whose circuit is a resistance 12. Motor 9 is supplied with current from supply circuit 13. Connected across a portion of resistance 12 are a pair of contacts 14 and 15, the latter being mounted on a movable arm 16, which is connected to and extends transversely from the shaft of rotor 22 of induction torque motor 17. Spring 18 is connected to arm 16 and serves normally to bias contacts 14 and 15 to their open position.

Motor 17 consists essentially of a three phase field winding, composed of three similar windings 19, 20, and 21, which may be connected in either mesh or star and are shown mesh connected, and a closed circuited rotor member 22 which may or may not be of the wound type as desired. The actual structural details of a preferred embodiment of this motor, which in themselves form no part of the present invention, are shown and described in United States Letters Patent No. 1,743,798, granted January 14, 1930 upon an application of Robert H. Park.

In order that motor 17 will produce a torque which is proportional to the power flow in the three phase supply circuit we provide means for applying respectively to two different pairs of terminals of the motor two voltages, or currents, which are each proportional respectively, in magnitude, to the voltage and current of this circuit during balanced conditions and which, when the power factor of the circuit is unity, are displaced in phase from each other by 60 degrees. A system of connections for securing this result is as follows, but it will be obvious to those skilled in the art that other equivalent phase shifting connections which accomplish the same result might be employed without departing from our invention in its broader aspects. Phase winding 19 is connected across lines 2 and 3 through a suitable potential transformer 23. Phase winding 20 is connected across the terminals of the secondary winding of a current transformer 25 in conductor 3. The secondary winding of a current transformer 26 in line 1 is reversely connected across the terminals of the secondary winding of current transformer 25 so that the voltage across phase winding 20 is proportional to the difference between the currents in lines 1 and 3. Variable resistance 24 is connected across phase winding 20 so that the current flowing through this winding may be adjusted at will.

The operation of our novel power responsive means is as follows: Referring to Fig. 2, in which vectors 01, 02 and 03 correspond to phase voltages of conductors 1, 2 and 3 in Fig. 1 it is seen that vector 2—3 represents the voltage between conductors 2 and 3, which may also be considered the voltage across phase winding 19. The small vectors which lie along the vectors 01 and 03 correspond to the voltages in the secondary windings of current transformers 26 and 25 respectively. Therefore, the small horizontal vector joining their ends, which represents their vector difference, corresponds to the vector voltage across phase winding 20. For the sake of convenience, this last vector is projected on a line between the characters 1 and 3 of Fig. 2. It will thus be seen that the voltages of phase windings 19 and 20, and consequently their currents, have a 60° phase displacement. As phase winding 21 is connected across the interconnected terminals of phase windings 19 and 20 its voltage, and consequently the current through it, will have a 60° phase displacement to the voltages and currents respectively in phase windings 19 and 20 just as is the case with an open delta connected transformer. As a result of the phase displacement of the currents in windings 19, 20 and 21 a rotating field is set up which induces currents in rotor 22 and the reactions of these currents upon the components of the rotating field produces a torque tending to turn rotor 22 in the same direction with the rotating field. As the currents induced in the rotor by the component of the rotating field which is proportional to current is acted upon by the field which is proportional to voltage and vice versa, the torque produced will be proportional to the product of current and voltage, that is to say, to the power flow through the circuit.

Referring now to Fig. 3, which shows the voltage vectors which are proportional to the line currents to be lagging the phase voltages or, in other words, which illustrates a condition of lagging power factor on the main supply circuit, it will be seen that the projection of their vector difference on the line joining 1 and 3 is shorter than is the actual length of this difference. It has been found that this shortening provides a substantially accurate power factor correction at power factors which are ordinarily encountered in practical operation. It will thus be seen that an increase in power flow on the three phase circuit supplying motor 4 will cause a counterclockwise torque to be produced by motor 17, thereby tending to cause engagement of contacts 14 and 15, while the decrease in power flow along this circuit will have the opposite effect.

The operation of the system in which we have illustrated one use of our power responsive means is as follows: Assume that supply circuits 1, 2 and 3 and circuit 13 are properly energized and that contacts 14 and 15 are disengaged. Under these conditions all of resistance 12 will be in circuit with field 11, thereby causing motor 9 to operate at its maximum speed, which in turn causes a maximum amount of work to be fed to grinder 5 and consequently causes a maximum load to be placed on motor 4. As a result the power flow through circuit 1, 2, 3 will increase until the torque of motor 17 overpowers the pull of spring 18 when contact 15 will rise and engage contact 14 thereby short circuiting a portion of resistance 12. This will cause an increase in the current through field 11, thereby decreasing the speed of motor 9, which in turn reduces the amount of work fed to grinder 5 and consequently reduces the load on motor 4. As a result the power flow through circuit 1, 2, 3 decreases, causing a resultant decrease in the torque of motor 17 until spring 18 causes the separation of contacts 14 and 15 when the above regulating cycle will be repeated.

The purpose of adjustable rheostat 24 is to make it possible to vary at will the desired constant load which is to be held on motor 4. Thus, by adjusting this resistance the current through winding 20 may be made the same for various currents in lines 1 and 3 corresponding to various loads on motor 4.

While we have shown and described a particular embodiment of our invention, it will be obvious to those skilled in the art that changes and modifications may be made without departing from our invention and we, therefore, aim in the appended claims to cover all such changes and modifications as fall within the true spirit and scope of our invention.

What we claim as new and desire to secure by Letters Patent of the United States is:

1. In combination, a polyphase power circuit, a polyphase induction motor having means for producing a rotating magnetic field and means connecting said motor to said circuit so that the torque of said motor is proportional to the power flow through said circuit.

2. In combination, a three phase circuit, a three phase induction motor comprising a field winding for producing a rotating magnetic field and an armature, and means connecting said field winding to said circuit in such a way that a torque is produced between said field winding and armature which is proportional to the power flow through said circuit.

3. In combination, a three phase power circuit, a three phase motor having three terminals, means for applying to a pair of the terminals of said motor a voltage which is proportional to the voltage of said circuit, and means for applying to another pair of said terminals a voltage which is proportional to the current of said circuit and which is displaced sixty degrees in phase from the voltage applied to said first mentioned pair of terminals.

4. In combination, a three phase circuit, a three phase induction motor comprising a field winding and a closed circuited armature, means connecting said field winding to said circuit in such a way that a torque is produced between said field winding and armature which is proportional to the power flow through said circuit, and means for adjusting the ratio between the power flow through said circuit and the torque of said motor.

5. In combination, a three phase circuit, an induction torque motor, said motor comprising a primary winding and a closed circuit secondary winding, a potential transformer, means connecting one of the phase windings of said primary winding between two of the conductors of said circuit through said potential transformer, a pair of current transformers, one of which is associated with the remaining conductor of said circuit, the other being associated with one of the first mentioned conductors of said circuit, means connecting one of the remaining phase conductors of said primary winding to the secondary windings of said current transformers in such a way that the voltage across it is proportional to the vector difference of the currents in the primary windings of said current transformers.

6. In a power responsive system, in combination a three-phase circuit, a control element responsive to power flow through said circuit, said element comprising a three-phase induction motor, means connecting one of the phase windings of said motor to be energized in accordance with the voltage between two of the conductors of said three phase circuit, and means connecting another of the phase windings to be energized in accordance with a voltage which is proportional to the vector difference between the currents in two of the conductors of said circuit, said voltage making a sixty degree phase angle with the voltage across said first mentioned phase winding at unity power factor.

7. In a power responsive system, in combination, a three phase circuit, a control element responsive to power flow through said circuit, said element comprising a three phase induction motor, means connecting one of the phase windings of said motor to be energized in accordance with the voltage between two of the conductors of said three phase circuit, means connecting another of the phase windings to be energized in accordance with a voltage which is proportional to the vector difference between the currents in two of the conductors of said circuit, said voltage making a sixty degree phase angle with the voltage across said first mentioned phase winding at unity power factor, and means for adjusting the relative magnitudes of said voltage and said line currents.

In witness whereof, we have hereunto respectively set our hands this 30th day of January, 1931, and this 22nd day of January, 1931.

LOUIS W. THOMPSON.
MYRON ZUCKER.